United States Patent [19]

Goodman et al.

[11] 3,896,016
[45] July 22, 1975

[54] FABRICATION OF LIQUID CRYSTAL DEVICES

[75] Inventors: Lawrence Alan Goodman, East Windsor, N.J.; David Emil Carlson, Yardley, Pa.

[73] Assignee: RCA Corporation, New York, N.Y.

[22] Filed: July 5, 1974

[21] Appl. No.: 486,244

[52] U.S. Cl.............................. 204/180 R; 204/130
[51] Int. Cl.............................................. B01d 13/02
[58] Field of Search............ 204/180 R, 130, 129.1; 65/30

[56] References Cited
UNITED STATES PATENTS

| | | | |
|---|---|---|---|
| 2,897,126 | 7/1959 | George....................... | 204/180 R X |
| 3,486,995 | 12/1969 | Evers........................... | 204/180 R X |
| 3,544,437 | 12/1970 | Loukes et al. ................. | 204/180 R |
| 3,622,295 | 11/1971 | Loukes et al. .............. | 204/180 R X |
| 3,627,491 | 12/1971 | Boffe et al. .................. | 204/180 R X |
| 3,711,393 | 1/1973 | Garfinkel....................... | 204/180 R |

*Primary Examiner*—John H. Mack
*Assistant Examiner*—A. C. Prescott
*Attorney, Agent, or Firm*—H. Christoffersen; M. Y. Epstein

[57] ABSTRACT

Glass workpieces having a conductive material film on one surface, for eventual use as substrates between which a liquid crystal material is contained, are treated to remove or deplete various impurities from a thin region within the substrates at the one surface.

4 Claims, 1 Drawing Figure

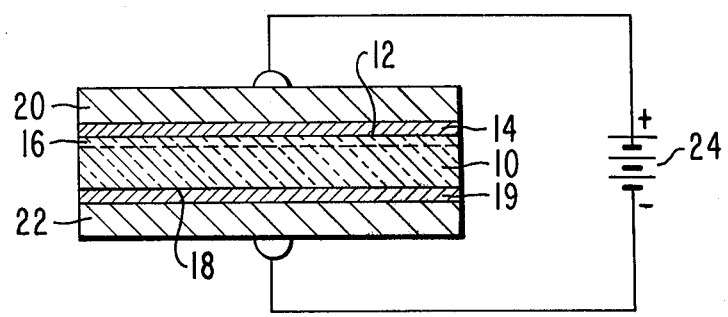

FABRICATION OF LIQUID CRYSTAL DEVICES

This invention relates to liquid crystal devices, and particularly to increasing the lifetime of such devices.

Liquid crystal devices of known type comprise a pair of oppositely disposed substrates, electrodes on the inside or facing surfaces thereof, and a liquid crystal material sandwiched between the substrates. The molecules of the liquid crystal materials are generally rodlike, and, depending upon the particular type of device and the particular liquid crystal material used, there is a desired or preferred orientation of the molecules at the inside surfaces of the substrates. For example, with known "field-effect" type devices using nematic liquid crystal materials, the molecules are preferably "aligned" (in the absence of distorting electric or magnetic fields) parallel to the substrate surfaces. Conversely, with known "dynamic scattering" type devices also using nematic liquid crystal materials, the molecules are preferably aligned perpendicular to the substrate surfaces.

Such devices suffer from "misalignment" when the molecules at the substrate surfaces are oriented in directions other than the preferred directions, such misalignment condition generally giving rise to defects in the appearance of the device. For example, in certain types of dynamic scattering devices, maximum transparency of the liquid crystal material is obtained when the liquid crystal molecules are aligned perfectly perpendicular to the substrate surfaces. If the device contains areas where misalignment exists, e.g., areas in which the molecules are tilted from the perpendicular, these misaligned areas appear less transparent, and generally somewhat hazy or cloudy in comparison with the aligned, transparent areas. These hazy areas distract from the attrativeness and legibility of the display, and are often so bad as to completely destroy the usefulness of the device.

The problems of misalignment appear to be most pronounced when the device is subjected to high temperatures, e.g., a glass frit sealing process of about 450°C.

An object of this invention is to solve the problem of misalignment.

The drawing shows a workpiece, in cross-section, of a type which can be worked on by the process of this invention.

An important aspect of the instant invention is the discovery of the cause of misalignment; such cause, we discovered, being the presence, on the inside surfaces of the device substrates, of various impurities, presumably alkali ions and presumably mostly sodium ions. The reason such impurities cause misalignment is not known.

One basis for our discovery, for example, is the fact that devices made with fused silica substrates do not suffer from misalignment problems, fused silica being a high "quality" glass with few impurities and little or no sodium content. While the use of fused silica substrates in liquid crystal devices is known, there apparently has been no recognition in the past of the advantage, with respect to the misalignment problem, of using fused silica, nor any recognition of why fused silica provides this advantage.

Fused silica is a relatively expensive material, and a preferred material for liquid crystal devices is the far less expensive and widely used "soft" soda-lime-silicate glass. As known, such glasses contain various impurities, particularly alkali ions, and particularly sodium ions. It presently appears that during the life of the liquid crystal devices, these various impurities, if present on the "inside" surfaces of the container containing the liquid crystal material, somehow interact with the liquid crystal molecules to cause a change in the orientation of the molecules, i.e., cause misalignment. In general, the problem becomes increasingly worse with the time.

A solution to this problem, we found, other than using sbustrates of impurity-free materials, e.g., fused silica, is to deplete or remove these impurities from regions of the device substrates at and immediately adjacent to the inside surfaces thereof. Neither the extent of nor the depth of the depleted regions is critical. However, if the device substrates are to be later subjected to an elevated temperature process, the depleted regions should preferably have a thickness or depth sufficient to prevent diffusion of impurities therethrough to the substrate surfaces. With substrates of soft glass, later heated to a temperature of about 350° to 450°C for about ½ hour, for sealing together two substrates, for example, it is estimated that an ion depletion depth of about 500A is adequate.

The concept of using surface ion depleted soda-lime-silicate glass substrates in liquid crystal devices is actually known. The purpose of such use is that it is found that conductive coatings, of tin oxide and/or indium oxide can be deposited on ion depleted surfaces by comparatively inexpensive processes, e.g., various vapor deposition techniques, with excellent coating physical characteristics normally only obtainable by the use of more expensive deposition processes, e.g., sputtering or vacuum evaporation methods. While not recognized in the past, we discovered that the use of surface ion depleted glass, made in experiments for demonstrating the improvements in the quality of the conductive coatings deposited thereon, provides greatly improved results with respect to the misalignment problem.

It so happens that soda-lime-silicate glasses, having high quality conductive films thereon are commercially available at comparatively low prices; such glasses being coated by known sputtering or vacuum evaporation techniques not requiring ion depleted surfaces for quality coatings. Thus, while techniques for solving the misalignment problem have been available in the past, e.g., the use of the fused silica substrates or ion depleted soft glass substrates, the recognition that such techniques solve the misalignment problem has not previously existed, nor have these techniques been used in the production of liquid crystal devices for commercial useage.

Based upon our discovery of the cause of the misalignment problem, our solution is that of ion depleting surface regions of glass substrates which have already been surface coated with a film of conductive material. This is not to suggest that the glass is twice ion depleted; rather, the invention has utility with glasses which have not previously been ion depleted from the purpose of improving the quality of conductive films deposited thereon.

Techniques for ion depleting surface regions of glass bodies are known, various techniques suitable for use in the practice of this invention being described in U.S. Pat. No. 3,179,919 issued Mar. 23, 1965, and U.S. Pat.

No. 3,811,855 issued May 21, 1974, and assigned to RCA Corporation.

In one embodiment of the invention, by way of specific example, a substrate 10 comprises a soda-lime-silicate or other high-alkali glass. By "high alkali" glass is meant a glass having an alkali oxide content of higher than about 12 percent by weight; by composition of the glass being in no way critical to the practice of this invention but simply being that of widely used commercially available soft glasses. The invention has utility with other, lower alkali content glasses, such as various Corning Company "Pyrex" glasses.

One surface 12 of the substrate 10 is coated with a thin film 14 of a conductive material, e.g., a known transparent composition comprising, by mole percent, 20 percent tin oxide and 80 percent indium oxide, the film 14 having been applied by known techniques, e.g., sputtering. The composition of the film 14 is not critical. In a liquid crystal device made later from the substrate 10, the surface 12 thereof is the "inside" surface, and the conductive film 14 is used to form one or more electrodes on the substrate.

For the purpose of depleting a thin region 16 within the substrate 10 at the surface 12 thereof, the opposite surface 18 of the substrate 12 is coated with a conductive layer 19 (e.g. graphite particles), and both the conductive film 14 on the surfaces 12 and the conductive layer 19 of the substrate 10 are contacted by electrodes 20 and 22, respectively, e.g., electrically conductive graphite-felt pads. The electrodes 20 and 22 are connected across a DC power supply 24, the electrode 20 being connected to the positive terminal of the supply 24.

Alternately, a corna or glass discharge may be used to make electrical contact to one or both substrate surfaces. If the surface 18 is contacted in such a manner the conductive coating 19 thereon is not necessary.

The ion depleting process, in this example, comprises applying about 100 volts, DC, between the electrodes 20 and 22, and then heating the substrates (with the voltage still applied) to a temperature of about 300°C for about 15 minutes, preferably, but not necessarily, in a dry, non-oxidizing atmosphere. During the process, positive ions within the glass are caused to move away from the positively charged film 14 thus depleting the region 16 beneath the film 14 of such charges. Generally, the process can be performed at any temperature between 150° and 500°C depending on the time and voltage used. The voltage can be applied to the electrodes after the substrate has been heated, but by so delaying the application of the voltage, it appears that some diffusion of alkali ions from the substrate 10 into the conductive film 14 occurs. While not known for certain, it appears that this is undesirable. Applying the voltage between the electrodes 20 and 22 during initial heating of the substrate prevents such diffusion.

Observations of substrates 10 treated as above-described suggest that the region 16 is just about totally depleted of sodium ions and non-bridging oxygen ions to a depth of about 4000A.

During the ion depletion process, free oxygen is evolved at the surface 12 of the substrate 10. Of importance, and this was not expected, is that the conductive film 14 is sufficiently porous to allow the oxygen to escape. If the film were not so porous, the process would either not work or at least operate at a much slower rate.

The ion depleted substrate 10 can then be incorporated into liquid crystal devices in accordance with known techniques. For example, the conductive layer 19 on the substrate 10 is generally removed while the film 14 can be left substantially intact or patterned, thus, in the latter case, exposing portions of the surface to direct contact with the liquid crystal material of the device. Also, the film 14 and exposed surface portions, if any, can be coated with a thin film, e.g., silicon monoxide, using known "slant" evaporation processes. For sealing together two substrates to form a container for the liquid crystal material, a glass sealant can be used as described in U.S. Pat. No. 3,778,127 issued on Dec. 11, 1973, the sealing process involving heating the substrates to an elevated temperature depending upon the glass sealing material used.

What is claimed is:

1. In the fabrication of a liquid crystal device comprising a pair of oppositely disposed substrates of an alkali-containing glass, first surfaces of each of said substrates being disposed in oppositely disposed, facing relationship, the method comprising:
    coating each of said first surfaces of said substrates with a layer of an electrically conductive material,
    depleting alkali ions from a region of each substrate immediately beneath said conductive material layer thereon using a process in which the positive terminal of a DC power supply is electrically connected to said first surface of each substrate through said conductive layer thereon, a second surface of each of said substrates spaced from said first surface thereof being electrically connected to the negative terminal of said power supply, and
    assembling said substrates with said first surfaces in facing relationship.

2. The method of claim 1 in which said ion depletion step includes heating said substrates at a preselected elevated temperature while applying a DC voltage of said stated polarity between said first and second surfaces of each of said substrates, and wherein said DC voltage is applied while said substrates are being heated up to said preselected temperature.

3. The method of claim 2 wherein said assembling step includes the further step of exposing said substrates to a second preselected temperature for a preselected time, said regions having been made of a depth sufficient to prevent diffusion of alkali ions therethrough during the performance of said further step.

4. The method of claim 3 in which said further step is performed at about 350°C for about ½ hour, and said regions are made of a depth of about 500A.

* * * * *